(12) United States Patent
Ben-Arie

(10) Patent No.: US 11,234,489 B2
(45) Date of Patent: *Feb. 1, 2022

(54) SPRING LACE RATCHETING DEVICE

(71) Applicant: Jezekiel Ben-Arie, Carlsbad, CA (US)

(72) Inventor: Jezekiel Ben-Arie, Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/100,921

(22) Filed: Nov. 22, 2020

(65) Prior Publication Data

US 2021/0251341 A1 Aug. 19, 2021

Related U.S. Application Data

(63) Continuation-in-part of application No. 16/792,324, filed on Feb. 17, 2020, now Pat. No. 10,874,177.

(51) Int. Cl.
*A43C 7/08* (2006.01)
*F16G 11/10* (2006.01)
*A43C 1/00* (2006.01)

(52) U.S. Cl.
CPC .............. *A43C 7/08* (2013.01); *A43C 1/00* (2013.01); *F16G 11/103* (2013.01)

(58) Field of Classification Search
CPC . A43C 7/08; A43C 1/00; F16G 11/103; F16G 11/101; A44B 11/125
See application file for complete search history.

(56) References Cited

U.S. PATENT DOCUMENTS

| 1,482,009 | A | * | 1/1924 | Heberling | ............ | A44B 11/125 |
| | | | | | | 24/191 |
| 3,605,205 | A | * | 9/1971 | Crissy | .................. | A44B 11/125 |
| | | | | | | 24/191 |
| 4,071,964 | A | | 2/1978 | Vogiatzis | | |
| 4,125,918 | A | | 11/1978 | Baumann | | |
| 4,130,949 | A | | 12/1978 | Seidel | | |
| 4,261,081 | A | | 4/1981 | Lott | | |
| 4,458,373 | A | | 7/1984 | Maslow | | |
| 4,507,878 | A | | 4/1985 | Semouha | | |
| 4,616,432 | A | | 10/1986 | Bunch | | |
| 4,648,159 | A | | 3/1987 | Dougherty | | |
| 4,991,273 | A | | 2/1991 | Huttle | | |
| 5,001,847 | A | | 3/1991 | Waters | | |
| 5,097,573 | A | | 3/1992 | Gimeno | | |

(Continued)

FOREIGN PATENT DOCUMENTS

DE 3344489 A1 12/1983

*Primary Examiner* — David M Upchurch

(57) ABSTRACT

The Lace Ratchet System (LRS) is a parallel configuration of two Lace Ratchet Devices (LRD) which facilitate two laces fastening. The LRD has two states: "active" and "inactive". In the active state the device works as unidirectional lace ratchet allowing the lace to be pulled forwards but restricting any lace motion backwards. After fastening the lace remains fastened until the LRD is switched into inactive state by manually releasing a latch. Each LRD has a turning gate rotatably installed diagonally in a channel with a sharp metallic front end. A resilient plate serves as preloaded spring that keeps the LRD in active position when the spring is not released. The LRD's smooth front end side and smooth channels' floors minimize lace wear. The LRS can be coupled with a clamp which clamps the laces' front ends to prevent dangling. The entire LRS except the blades is made of plastic.

18 Claims, 9 Drawing Sheets

(56) References Cited

U.S. PATENT DOCUMENTS

| | | |
|---|---|---|
| 5,109,581 A | 5/1992 | Gould |
| 5,119,539 A | 6/1992 | Curry |
| 5,177,882 A | 1/1993 | Berger |
| 5,203,053 A | 4/1993 | Rudd |
| 5,230,171 A | 7/1993 | Cardaropoli |
| 5,293,669 A | 3/1994 | Sampson |
| 5,293,675 A | 3/1994 | Shai |
| 5,295,315 A | 3/1994 | Osawa |
| 5,335,401 A | 8/1994 | Hanson |
| 5,467,511 A | 11/1995 | Kubo |
| 5,477,593 A | 12/1995 | Leick |
| 5,572,774 A | 11/1996 | Duran |
| 5,572,777 A | 11/1996 | Shelton |
| 5,588,186 A | 12/1996 | Ko |
| 5,647,824 A | 7/1997 | Levenson |
| 5,661,877 A * | 9/1997 | Bloomer .............. A44B 11/12 24/170 |
| 6,076,241 A | 6/2000 | Borel |
| 6,094,787 A | 8/2000 | Chang |
| 6,192,241 B1 | 2/2001 | Yu |
| 6,192,559 B1 | 2/2001 | Munsell |
| 6,282,817 B1 | 9/2001 | Curet |
| 6,334,240 B1 | 1/2002 | Li |
| 6,339,867 B1 | 1/2002 | Azam |
| 6,438,871 B1 | 8/2002 | Culverwell |
| 6,588,079 B1 | 7/2003 | Manzano |
| 6,622,358 B1 | 9/2003 | Christy |
| 6,729,000 B1 | 5/2004 | Liu |
| 6,735,829 B2 | 5/2004 | Hsu |
| 6,938,308 B2 | 9/2005 | Funk |
| 7,082,701 B2 | 8/2006 | Dalgaard |
| 7,100,901 B2 | 9/2006 | Gleinser |
| 7,152,285 B2 | 12/2006 | Liao |
| 7,313,849 B2 | 1/2008 | Liu |
| 7,320,161 B2 | 1/2008 | Taylor |
| 7,360,282 B2 | 4/2008 | Borsoi |
| 7,591,050 B2 | 9/2009 | Hammerslag |
| 7,681,289 B2 | 3/2010 | Liu |
| 8,046,937 B2 | 11/2011 | Beers |
| 8,141,273 B2 | 3/2012 | Stramare |
| 8,230,560 B2 | 7/2012 | Luzlbauer |
| 8,231,074 B2 | 7/2012 | Hu |
| 8,332,994 B2 | 12/2012 | Lin |
| 8,371,004 B2 | 2/2013 | Huber |
| 8,381,362 B2 | 2/2013 | Hammerslag |
| 8,935,833 B2 * | 1/2015 | Kaneko ................ A44B 11/065 24/170 |
| 9,185,948 B2 | 11/2015 | Ben-Arie |
| 10,070,701 B1 * | 9/2018 | Liu ...................... A44B 11/125 |
| 2002/0002781 A1 | 1/2002 | Bouirer |
| 2003/0226284 A1 | 12/2003 | Grande |
| 2004/0075088 A1 * | 4/2004 | Rard .................... A44B 11/125 254/199 |
| 2005/0005477 A1 | 1/2005 | Borsoi |
| 2006/0213085 A1 | 9/2006 | Azam |
| 2007/0169380 A1 | 7/2007 | Borsoi |
| 2008/0250618 A1 | 10/2008 | Stramare |
| 2009/0172929 A1 | 7/2009 | Hwang |
| 2010/0115744 A1 | 5/2010 | Fong |
| 2011/0094072 A1 | 4/2011 | Lin |
| 2013/0239375 A1 * | 9/2013 | Horimoto ............ A44B 11/065 24/69 ST |
| 2015/0113770 A1 | 4/2015 | LaatzKore |

* cited by examiner

SPRING LACE RATCHETING DEVICE

CROSS-REFERENCE TO RELATED APPLICATIONS

This Application is Continuation In Part of application Ser. No. 16/792,324 Filed on Feb. 17, 2020.

FEDERALLY SPONSORED RESEARCH

Not Applicable

SEQUENCE LISTING OR PROGRAM

Not Applicable

FIELD OF THE INVENTION

The invention is related to devices for fastening and keeping fastened laces, chords, ropes, strings and alike.

BACKGROUND OF THE INVENTION

Prior Art

Many devices were invented for shoe lace tightening. The most commercially successful is U.S. Pat. No. 6,339,867 by Azam which is widely used in fastening laces of skiing and skates boots. The tightening principle is a spring loaded gear wheel which can move in wedge shaped passage which widens forwards and narrows backwards. The laces pass through that passage and can be fastened by pulling the laces forwards which in turn pulls forwards the gear wheel towards the wider part of the passage where the laces are free to move. When the pulling stops the laces pull the gear wheel backwards, which narrows the passage and blocks the laces' backwards motion. The laces can be released by pulling the gearwheel forwards with a knob. There are few noticeable disadvantages to this popular invention. The device must be installed on heavy-solid footwear which eliminates its use with regular shoes and the user must constantly pull the knob to keep the releasing. In addition, the teeth of gearwheel and opposite teeth cause severe lace wear. Similar approach is taken in U.S. Pat. No. 7,360,282 by Borsoi and in U.S. Pat. No. 8,141,273 by Stramare. The lace buckle device described in U.S. Pat. No. 6,334,240 by Li is used widely in coat laces. It has a lace passage controlled by a spring loaded piston that blocks lace motion when the spring is released. Except for the similar name there is no similarity to our invention. This buckle controls only one lace and does not have a ratchet operation at all. When the user wants to release or fasten the lace the user has to press the spring loaded piston, release the lace and pull at the same time. When the spring is released, the buckle returns to b the lace. Similar devices are sold as "shoe buckles" for fastening shoe laces. The main disadvantage of such shoe buckles is that they do not have a ratcheting operation, which enables one to fasten the laces just by pulling. The shoe buckles require one to fasten the laces with one hand while keeping the buckle in position with the other hand and then switching the buckle into position. This results in cumbersome and inefficient fastening.

In U.S. Pat. No. 6,729,000 Liu uses for lace tightening a teethed rotating bar. In U.S. Pat. No. 6,076,241 by Borel and in several others such as in U.S. Pat. No. 6,622,358 to Christy and in U.S. Pat. No. 6,192,241 by Yu et al. use fastening devices which are based on pipes or channels which have diagonal teeth to block reverse motion of the lace. The pipes are installed on the shoes in different locations.

In U.S. Pat. No. 8,371,004 Huber teaches a lace mechanism. Huber's mechanism employs a pair of spring loaded pivoted arms which have sets of sharp teeth that when pressed against the laces block their motion in both directions. Thus, Huber's mechanism is not a lace ratchet mechanism because it does not allow further lace tightening once it is. In its state, the laces are released in both directions simply by pressing the arms of Huber's mechanism. Huber's mechanism is impractical because the sharp teeth tend to cause a lot of lace wear when the laces are fastened before. Huber's mechanism structure is complex and expensive to manufacture. In addition, similar to the lace buckle, the user needs to fasten both laces with one hand while pressing the arms with the second hand to keep the mechanism in position. In U.S. Pat. No. 8,332,994 Jih-Liang Lin teaches a shoe lace fastener which fasten the lace using jagged arm on top and jagged base on bottom. The device structure includes many complex parts and is expensive to manufacture. Such a structure also is impractical because it will wear the lace very quickly. In U.S. Pat. No. 8,381,362 to Hammerslag et al. teaches Real based closure system. U.S. Pat. No. 8,332,994 to Lin teaches Shoelace with shoelace fastener. U.S. Pat. No. 8,141,273 to Stramare et al. describes Shoes with directional conditioning device for laces. U.S. Pat. No. 8,231,074 to Hu et al. describes Lace winding device for shoes. U.S. Pat. No. 8,230,560 to Luzlbauer teaches Fastening system for shoes.

U.S. Pat. No. 9,185,948 to Ben-Arie describes a Buckle Lace Fastening Device (BLFD) which also enables lace ratcheting. However, the BLFD is using resilient gates which do not rotate but bend. In addition, the mechanism of the BLFD, which is based on rotating the gripping floor is entirely different from the mechanism of the current invention.

U.S. Pat. No. 8,046,937 to Beers et al. describes an Automatic lacing system. U.S. Pat. No. 7,681,289 to Liu describes a Fastener for fasting together two lace systems. U.S. Pat. No. 7,591,050 to Hammerslag describes a Footwear lacing system. U.S. Pat. No. 7,320,161 to Taylor describes a Lace tying device. U.S. Pat. No. 7,313,849 to Liu describes a Fastener for lace. U.S. Pat. No. 7,152,285 to Liao describes a Shoe lace fastening device. U.S. Pat. No. 7,082,701 to Dalgaard describes Footwear variable tension lacing systems. U.S. Pat. No. 6,938,308 Funk describes a lace securing and adjusting device. U.S. Pat. No. 6,735,829 Hsu describes a U shaped lace buckle. In U.S. Pat. No. 6,588,079 to Manzano describes a Shoelace fastening assembly. U.S. Pat. No. 6,438,871 to Culverwell describes Footwear fastening. U.S. Pat. No. 6,192,559 to Munsell Jr. describes a Shoelace fastening apparatus. U.S. Pat. No. 6,094,787 to Chang describes a Fastening device. U.S. Pat. No. 5,572,777 to Shelton describes a Shoelace tightening device. U.S. Pat. No. 5,572,774 to Duren teaches a Shoe fastening attached device. U.S. Pat. No. 5,467,511 to Kubo describes a Shoelace fastening device. U.S. Pat. No. 5,335,401 to Hanson teaches a Shoelace tightening and device. U.S. Pat. No. 5,295,315 to Osawa et al. describes a Shoe fastening device and plate shaped member thereof. U.S. Pat. No. 5,293,675 to Shai describes a Fastener for shoelace. U.S. Pat. No. 5,293,669 to Sampson teaches a Multiuse fastener system. U.S. Pat. No. 5,230,171 to Cardaropoli teaches a Shoe fastener. U.S. Pat. No. 5,203,053 to Rudd teaches a Shoe fastening device. U.S. Pat. No. 5,177,882 to Berger teaches a Shoe with central fastener. U.S. Pat. No. 5,119,539 to Curry teaches a Lace fastener. U.S. Pat. No. 5,109,581 to Gould teaches a Device and method for securing a shoe. U.S. Pat. No. 4,991,273 to Huttle teaches Shoe lace fastening. U.S. Pat. No. 4,648,159 to Dougherty teaches a Fastener for lace or rope or the like. U.S. Pat. No. 4,616,432 to Bunch et al. teaches a Shoe upper with lateral fastening arrangement. U.S. Pat. No. 4,507,878 to Semouha teaches a Fastener mechanism. U.S. Pat. No. 4,458,373 to Maslow teaches Laced shoe and method for tying shoelaces. U.S. Pat. No. 4,261,081 to Lott teaches a Shoelace tightener. U.S. Pat. No. 4,130,949 to Seidel teaches Fastening means for sports shoes. U.S. Pat. No. 4,125,918 to Baumann teaches a Fastener for lace shoes. U.S. Pat. No. 4,071,964 to Vogiatzis teaches a Footwear fastening system. U.S. Pat. No. 5,097,573 to Gimeno teaches Fastening Device for Lace Up Shoes. U.S. Pat. No. 5,001,847 to Waters teaches a Lace Fastener. U.S. Pat. No. 5,477,593 to Leick teaches a Lace Device. U.S. Pat. No. 6,282,817 to Curet teaches an Apparatus and Method for Lacing.

US Patent Applications

In US 2011/0094072 to Lin describes a Shoelace with Shoelace Fastener. In US 2010/0115744 to Fong describes a Lace Fastener. In US 2009/0172929 to Huang describes a Device for tying Shoe laces. In US 2008/025068 to Stramare describes a Shoe with Directional Conditioning Device for lace or the like. In US 2007/0169380 to Borsoi teaches a Device for B Flexible Strands. In US 2006/0213085 to Azam teaches an Article for Footware with Linkage Tightening Device. In US 2005/0005477 to Borsoi teaches a Lace B Device. In US 2003/0226284 to Grande teaches a Lacing System For Skates. In US 2002/0002781 to Bourier teaches a Lace Tightening Device Having a Pocket for Storing a B Element.

BRIEF SUMMARY OF THE INVENTION

In conclusion, all the inventions described above do not propose a Lace Fastening Device which combines all of the following desired properties which we include in our invention. It is desired that our invention will have the following properties:
1. Our Lace Ratcheting Device (LRD) enables users to fasten laces (and also chords, ropes, strings and alike) by a unidirectional ratchet operation, i.e. the user has just to pull the lace and the lace remains fully fastened after the pulling stops until the user manually releases the ratchet.
2. A novel ratchet mechanism which utilizes a turning gate with a single blade at its front end. The ratchet operation is based on the diagonal orientation of the turning gate in the channel which carries the lace. At its active state the ratchet mechanism facilitates forward motion of the lace but severely restricts backwards motion of the lace.
3. The lace can be manually released easily and quickly by the user.
4. An important innovation of this invention is the elimination the metal spring by replacing it with an elastic plastic member which exploits the resiliency of the plastic material to construct a biased spring. The biased spring is configured to turn the turning gate such that it engages the blade installed at its front end with the lace thus activating the ratchet mechanism of the LRD during idle time.
5. Repeated use of the device causes minimal lace wear that is achieved by the special structure of the turning gate which has at its front side only one sharp blade with a smooth side plane. The blade does not wear the lace when it blocks the lace because it just pressurizes it against the opposite gripping floor and it does not cut into the lace. Also, when the lace slides forwards the blade turns forwards as well and the lace slides engaging the smooth side of the blade.
6. The device can fasten any standard lace and can be easily installed on footwear items, garments or other objects.
7. The tapered front end of the LRD's turning gate which controls the lace is made of metal which resists breaking and wearing.
8. The LRD has a simple structure, which is suited for low cost manufacturing from plastics.
9. Another significant innovation is the introduction of a clamp which is attached to the rear side of the LRD and enables to tie to the LRD the front loose ends of the laces. Other lace fastening devices employ separate clasps which tie the front loose front ends of their laces. But such a separate clasp has the disadvantage that it dangles freely on top of the footwear and needs to be anchored.
10. Another innovation of LFD is the replacement of the metal rivet axle of the turning gate with plastic axles which are integral parts of LFD's structure. This innovation significantly simplifies and reduces the expenses of manufacturing.

The invention includes various lace ratcheting configurations of the basic lace ratcheting device. These configurations facilitate easy fastening and keeping fastened of: laces, ropes, strings and alike. The basic Lace Ratcheting Device (LRD) is small in dimensions and can be installed on footwear items or on other objects which need fastening of laces, ropes, strings and alike. The LRD can be used to fasten laces simply by inserting the laces into LRDs and pulling them. The LRD has a proportional blocking ratcheting mechanism. It means that LRD's mechanism automatically locks and restricts the lace motion backwards when the lace is pulled backwards and the mechanism applies a blocking force which is proportional to the backwards pulling force.

The ratcheting mechanism has two states: "active" and "inactive". In the active state the device works as a lace ratchet i.e. allowing the lace to be pulled forwards but blocks or severely restricts any lace motion backwards. After the user has fastened the laces they remain fastened until the mechanism is switched into an inactive state. In the inactive state the lace is allowed to move freely forwards and backwards. Each LRD has a channel for fastening one lace. In one embodiment of the LRD, the channel comprises of several walls including a gripping floor. A turning gate (made of solid material) is rotatably installed within the channel on a fulcrum i.e. an axle fitted into a bearing. The axle is centered at the turning gate's axis of rotation. The turning gate comprises of a front end and a rear end wherein the axis of rotation is situated between the two ends. The gate's front end is opposite the gripping floor and there is a gap between the front end and the gripping floor. The lace passes through the gap. The turning gate's resilient rear end serves as a spring and also as a releasing lever. At the idle state, the spring is installed preloaded with a bias which tends to turn the gate in backwards direction i.e. towards an active state in which the front end applies pressure force on the lace which is squeezed in the gap between the gripping floor and the turning gate's front end. Thus, at the idle state, the turning gate is in active state and it is switched into inactive state only when the user applies manual pressure on the lever which exceeds the spring's bias and turns the turning gate forwards, thus increasing the gap and releasing the pressure force the front end applies on the lace in the gap. The turning gate has a front end which holds a metal blade with single tapered front edge i.e. a sharp front edge with a smooth side i.e. the blade front end is tapered i.e. sharp and has a smooth side at its lower side. The lace passes through a gap between the front end of the turning gate and the channel's gripping floor situated opposite to the front end of the turning gate. The gap width is controlled by the turning gate, which can be deactivated by increasing the gap by manually pressing the lever.

When the ratcheting mechanism is in the active state, the gap is narrowed such that the front end applies a pressure force which is squeezing the lace in the channel with its tapered i.e. sharp edge. At this state the mechanism and acts as a lace ratchet. It means that the turning gate allows forwards fastening motion of the lace but blocks or severely restricts any lace translation in backwards direction. In order to have a ratcheting operation, the turning gate is installed in a forwards leaning diagonal orientation in the channel one way to define the required diagonal orientation is to require that a straight line emanating from the tip of the gate's front end and passes through the gate axis of rotation has an obtuse angle with the forward direction of the channel. Another way to define the required gate's forwards leaning diagonal orientation is to require that the gate's front end will be closer to the gripping floor then its axis of rotation. Also, in a forwards leaning diagonal orientation, the turning gate's front end is closer to the channel's exit than the turning gate's axis of rotation. The ratchet operation of the gate stems from the forward leaning diagonal orientation of the turning gate, which allows forwards lace motion when the lace is moved forwards. Moving forwards the lace which is squeezed in the gap, drags the turning gate's front end forwards due to the friction force which exists between the lace and the front end because of the pressure force applied by the front end on the lace. When the front end moves forwards also the turning gate turns forwards as well. Due to the forwards leaning diagonal state of the turning gate, when its front end is moved forwards it also moves laterally inwards i.e. away from its gripping floor, thus increasing the width of the gap between the front end and its gripping floor which results in diminished pressure force of the front end on the lace. Reduced pressure force on the lace results in reduced friction between the lace and the surface of the gripping floor and also reduced friction between the lace and the front end and enabling (facilitating) even easier forwards motion of the lace.

On the other hand, if the lace moves backwards it also drags the turning gate's front end backwards since the front end is squeezing the lace and has a mutual friction force with the lace. When the front end moves backwards also the turning gate turns backwards as well. Due to the forwards leaning diagonal orientation of the gate, the motion backwards of the front end has also a lateral outwards component which moves the front end towards the gripping floor thus further narrowing the gap which increases the pressure force of the front end on the lace and further restricting backwards lace motion. Thus, in an active state the gate acts as a lace ratchet i.e. facilitates lace forwards motion but blocks lace's backwards motion. When the ratcheting mechanism is switched into inactive state, the turning gate is turned forwards by the user and the gap is widened more than the lace's width. Thus the pressure force of the front end on the lace is diminished and the lace is entirely released because it can move freely forwards or backwards in the channel. The user can easily switch the ratcheting mechanism from active to inactive state simply by manually pressing on the lever, which is the rear end of the turning gate. If the manual pressure is greater than the spring's preloading bias, the gate turns forwards and increases the gap's width, thus inactivating the LRD. When the manual pressure ceases the preloaded spring turns the gate backwards into an active state. The LRD can be manufactured at low cost because it has a simple structure with only few parts, which could be made from plastics. To protect the tapered front end of the turning gate the front end is made of metal.

The LRD's structure is different from other lace fastening devices in few important aspects. Primarily, the LRD enables a lace ratcheting operation which is "proportional blocking" it means that in the blocked state pulling backwards the blocked lace with more force, only increases the blocking force. In addition, our LRD was configured to employ a ratcheting mechanism which causes only minimal wear of the lace since it employs in the channel a novel structure with a diagonally forwards leaning rotating gate with a single tapered i.e. sharp metallic front end which has a smooth side at its lower side opposite the gripping floor. When the lace is moved forwards, the tapered i.e. sharp edge at the front end of the turning gate rotates forwards this also turns the smooth side of the tapered i.e. sharp edge to be approximately parallel with the lace and the lace is sliding on the smooth side of the tapered i.e. sharp blade—which does not wear the lace. At the same time, the forwards rotation also widens the gap and reduces lace friction and wear while the lace is moved forwards. Since the lace is blocked from moving backwards, there is no lace wear in the backwards motion as well. In addition, the LRD's gripping floor is manufactured with a smooth surface to minimize lace wear when it moves in the gap as well. In contrast, other lace fastening devices employ gates with serrated surfaces and/or with sharp teeth structures in order to block lace movement in their blocked state. However, sharp teeth structures cause significant lace wear even when they turn into their unblocked state since their teeth remain pointed at the lace and the lace still touches them as it moves even in a wider gap.

A pair of LRDs in a parallel configuration can be used as a "Lace Ratcheting System" (LRS) for a shoe. The LRS is not attached to the shoe but enables fastening two ends of each shoe lace. The LRDs are attached to one another in a parallel configuration of their channels by joining the LRDs gripping floors into a joint gripping floor. Such a shoe buckle, which is not attached to the shoe, enables easy fastening and releasing of the shoe laces. The two gate levers of the turning gates which have the shapes of trapezoidal plates are made of resilient material and also serve as springs with bias which turns the turning gates such that their front ends engage their laces. Thus activating the LRDs.

The LRS configuration of two parallel LRDs is designed to lie flat on top of the shoe when the laces are fastened. Each of the channels at the entry opening is situated approximately in the middle of the LRS because the rear edge of the joint gripping floor is attached to a horizontal rear floor extension of a clamp. The two ends of the laces which emerge from shoe are inserted into the 2 channels via the 2 entry openings. When a lace is fastened, the lace applies a downwards force on the LRS joint gripping floor and also on the attached rear extension horizontal floor of the clamp. The downwards force is countered by a natural reaction upwards force which is applied by the shoe on the LRS joint gripping floor and also on the attached rear extension horizontal floor of the clamp. The downwards force and the reaction upwards force clutch the LRS flat on top of the shoe.

The LRD has many advantages over previous devices primarily due to its efficient and easy fastening operation by a ratchet mechanism which requires the user just to pull the lace. An important advantage of the LRD is its proportional blocking ratcheting mechanism it means that in the active restricting state pulling backwards the restricted lace with more force, only increases also the restricting force. This prevents the lace from slipping. Once the lace is pulled, it remains fastened until the ratcheting mechanism is switched from active state into inactive state whereby the ratchet mechanism is disabled and releases the lace. An additional advantage the LRS has over all the other lace ratchets is the very low wear of the laces caused by repeated use because the LRS does not block or restrict the lace movement using jagged surfaces. Handling laces with fastening devices which have jagged surfaces or which have sharp teeth, as all other lace fasteners do, results in fast wear of the laces. The diagonal orientation of the turning gate's tapered front end i.e. the sharp edges at the front ends of the turning gates in the LRDs, cause very little lace wear because it presses on the lace only when the lace is blocked. In addition, each tapered i.e. sharp edge has a smooth side on which the lace slides when it is fastened. The LRD was worn and tested daily by the Applicant for more than two years on various shoes without any noticeable lace wear. Another improvement is the sheet metal blade installed at the turning gate's front end. Unlike plastic blade which becomes dull in long use, the metal blade remains sharp and does not tend to break.

BRIEF DESCRIPTION OF THE DRAWINGS

FIG. 6 also depicts a couple of laces which demonstrate the how they are laid in the channels of the LRS and in the Clamp. The laces are not clamped in FIG. 6. The disassembled parts' orientations correspond to their actual orientations in the assembled LRS.

FIG. 7 also depicts a couple of laces which demonstrate the how they are laid in the channels of the LRS and in the Clamp. The laces are clamped in FIG. 7. The disassembled parts' orientations correspond to their actual orientations in the assembled LRS.

FIG. 8 also depicts a couple of laces which demonstrate the how they are laid in the channels of the LRS and in the Clamp. The turning gates are in active state and the laces are clamped in FIG. 8.

DETAILED DESCRIPTION OF THE DRAWINGS

Figure 1:
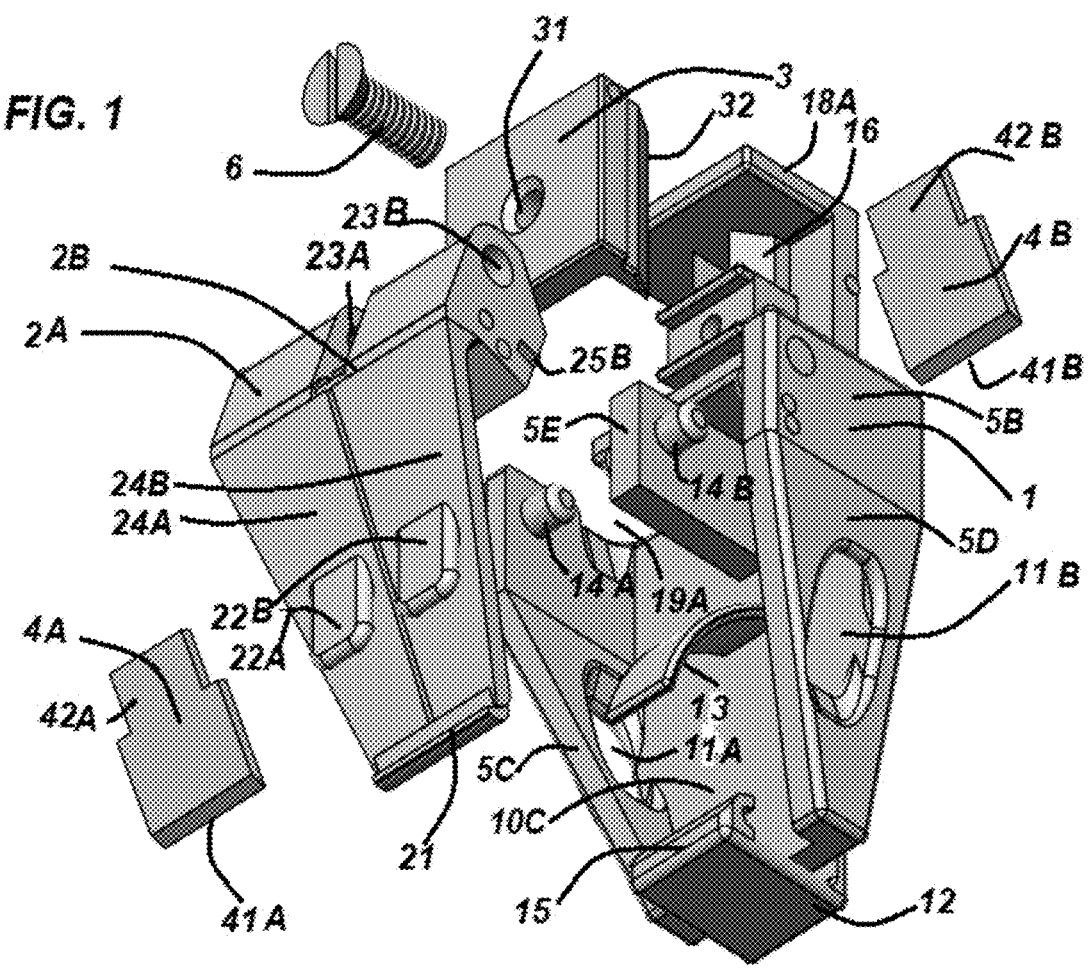
FIG. 1 illustrates a 3D isometric top frontal view of the parts of an embodiment of a disassembled two joined LRDs (Lace Ratcheting Devices) in a parallel configuration namely a Lace Ratcheting System (LRS). At their rear side, the joined LRDs are coupled with a lace clamp which ties the loose front ends of the laces. The disassembled parts' orientations correspond to their actual orientations in the assembled LRS.
Figure 2:
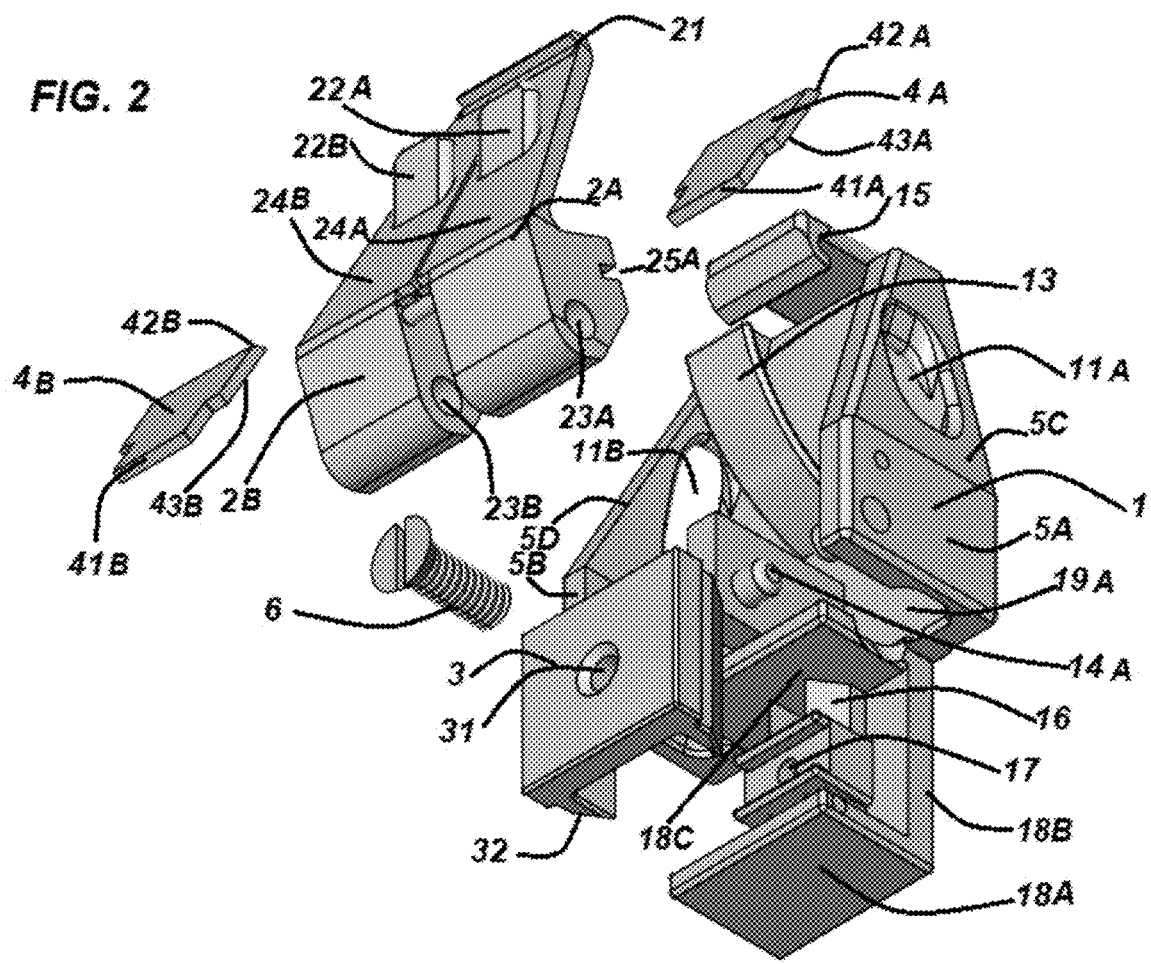
FIG. 2 shows a 3D isometric top rear view of the parts of an embodiment of a disassembled two joined LRDs (Lace Ratcheting Devices) in a parallel configuration namely a Lace Ratcheting System (LRS). At their rear side, the joined LRDs are coupled with a lace clamp which ties the loose front ends of the laces. The disassembled parts' orientations correspond to their actual orientations in the assembled LRS.
Figure 3:
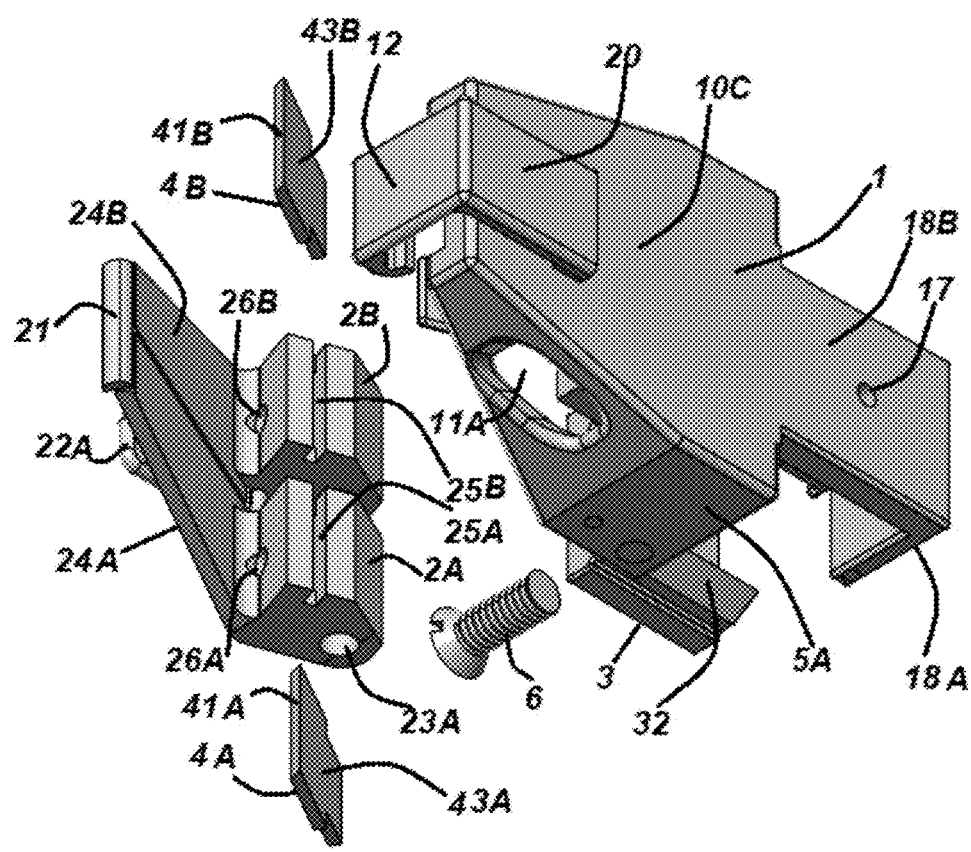
FIG. 3 shows a 3D isometric frontal bottom view of the parts of an embodiment of a disassembled two joined LRDs (Lace Ratcheting Devices) in a parallel configuration namely a Lace Ratcheting System (LRS). At their rear side, the joined LRDs are coupled with a lace clamp which ties the loose front ends of the laces. The disassembled parts' orientations correspond to their actual orientations in the assembled LRS.
Figure 4:
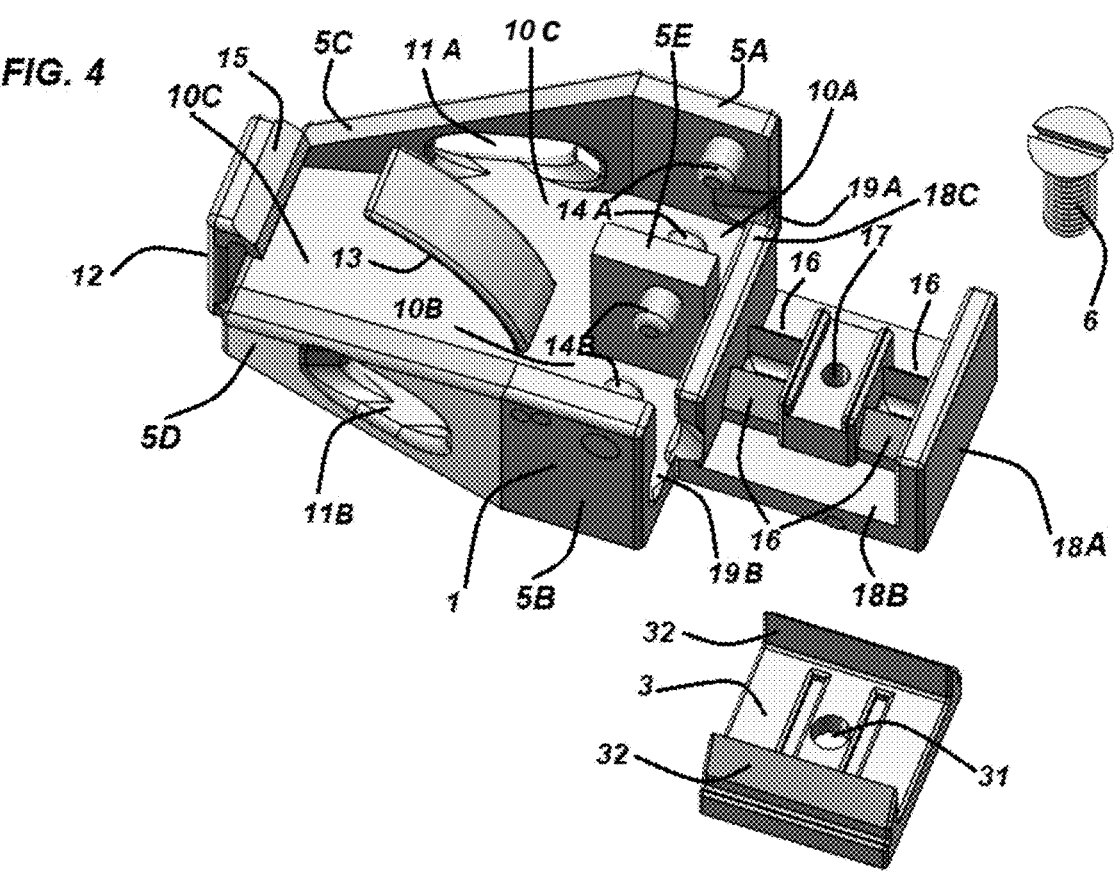
FIG. 4 depicts a 3D isometric top side view of the parts of an embodiment of a disassembled two joined LRDs (Lace Ratcheting Devices) in a parallel configuration namely a Lace Ratcheting System (LRS). The turning gates are not shown in FIG. 4. At their rear side, the joined LRDs are coupled with a lace clamp which ties the loose front ends of the laces. The disassembled parts' orientations correspond to their actual orientations in the assembled LRS.

FIG. 1, FIG. 2, FIG. 3, FIG. 4 and FIG. 5 show different views of the same embodiment of a disassembled LRS (Lace Ratcheting System) 1 composed of two joined LRDs (Lace Ratcheting Devices) in a parallel configuration. At the rear side of the LRS the joined LRDs are coupled with a lace clamp. The clamp construction includes two vertical walls 18A, 18C which are connected by a horizontal floor 18B. The clamp is attached to the rear side of the LRS in order to tie the loose front ends of the laces. The disassembled parts' orientations in the figures correspond to their actual orientations in the assembled LRS. FIG. 1 illustrates a 3D isometric top frontal view of the parts of an embodiment of a disassembled LRS (Lace Ratcheting System) 1. FIG. 2 shows a 3D isometric top rear view of the parts of an embodiment of a disassembled two joined LRDs (Lace Ratcheting Devices) in a parallel configuration namely a Lace Ratcheting System (LRS). FIG. 3 shows a 3D isometric frontal bottom view of the parts of an embodiment of a disassembled two joined LRDs (Lace Ratcheting Devices) in a parallel configuration namely a Lace Ratcheting System (LRS). FIG. 4 depicts a 3D isometric top side view of the parts of an embodiment of a disassembled two joined LRDs (Lace Ratcheting Devices) in a parallel configuration namely a Lace Ratcheting System (LRS). The turning gates are not shown in FIG. 4.

Figure 5:
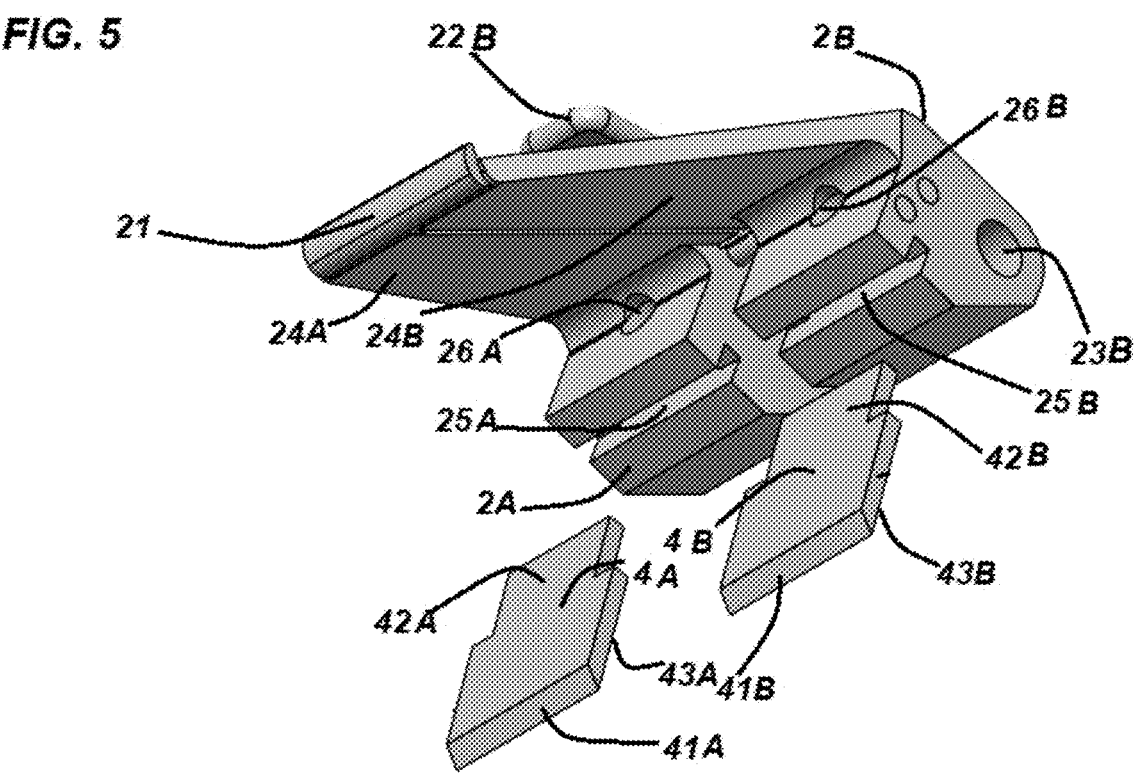
FIG. 5 shows a 3D isometric side bottom view of the parts of an embodiment of the turning gate of a disassembled two joined LRDs (Lace Ratcheting Devices) in a parallel configuration namely a Lace Ratcheting System (LRS). The disassembled parts' orientations correspond to their actual orientations in the assembled LRS.

FIG. 5 shows a 3D isometric side bottom view of the parts of an embodiment of the turning gate of a disassembled two joined LRDs (Lace Ratcheting Devices) in a parallel configuration namely a Lace Ratcheting System (LRS). Hence, the descriptions in the following sections [0030]-[0061] pertain to FIG. 1-FIG. 5.

The Lace Ratcheting System (LRS) 1 is composed of a first lace ratcheting device and a second lace ratcheting device. The first lace ratcheting device further comprises a first turning gate 2A, a first blade 4A and a first channel which extends from the first channel entrance 19A to the first channel exit 11A. The first channel is configured to carry through a segment of the first lace. The first channel extends in a first forwards direction from a first channel entrance 19A towards a first channel exit 11A. The first backwards direction is the opposite direction to the first forwards direction. The first channel further comprises a first gripping floor 10A being adapted with a first smooth gripping surface configured to engage the first lace.

The first lace ratcheting device has a first active state and a first inactive state. While in the first active state, the first lace ratcheting device is configured to restrict translation of the first lace in the first channel in the first backwards direction and to facilitate translation of the first lace in the first forwards direction in the first channel. While in the first inactive state, the first lace ratcheting device is configured to facilitate translation of the first lace both in the first forwards direction and in the first backwards direction.

The first turning gate 2A is rotationally engaged with the first channel at a first axle 14A, wherein the first turning gate 2A comprises a first blade holder 25A attached to a first elastic member 24A. The first blade 4A includes a first blade front 41A and a first blade rear 42A. The first blade 4A is installed into the first blade holder 25A such that the first blade front 41A protrudes at a first front of the first blade holder 25A. The first turning gate 2A is diagonally installed in the first channel such that a first straight line emanating from the first blade front 41A and passing through the first axle 14A is at a first obtuse angle with respect to the first forwards direction. The first blade front 41A is placed within the first channel opposite the first gripping floor 10A. The first blade front 41A is placed opposite the first gripping floor 10A such that there is a first gap between the first blade front 41A and the first gripping surface 10A, where the first lace is configured to pass through the first gap.

The first turning gate 2A is configured to be turned in a first backwards turning direction when the first blade front 41A is being moved in the first backwards direction. The first turning gate 2A is configured to be turned in a first forwards turning direction when the first blade front 41A is being moved in the first forwards direction. The first turning gate 2A is configured to reduce the first gap and to increase a first pressure force exerted by the first blade front 41A on the first lace when the first turning gate 2A is being turned increasingly in the first backwards turning direction. Furthermore, the first turning gate 2A is configured to increase the first gap and to reduce the first pressure force exerted by the first blade front 41A on the first lace when the first turning gate 2A is being turned increasingly in the first forwards turning direction.

At the first active state, the first blade front 41A is configured to exert the first pressure force on the first lace and the first blade front 41A is configured to frictionally engage the first lace and to turn the first turning gate 2A in the first forwards turning direction when the first lace is translated in the first forwards direction. In addition, at the first active state the first blade front 41A is configured to frictionally engage the first lace and to turn the first turning gate 2A in the first backwards turning direction when the first lace is translated in the first backwards direction.

While at the first active state, the first turning gate 2A is configured to facilitate first forwards translation of the first lace by turning increasingly in the first forwards turning direction and consequently diminishing the first pressure force of the first blade front 41A on the first lace. While at the first active state, the first turning gate 2A is configured to restrict first backwards translation of the first lace by increasingly turning in the first backwards turning direction and consequently increasing the first pressure force of the first blade front 41A on the first lace. At the first inactive state of the first lace ratcheting device, the first gap is being increased and the first blade front 41A is configured not to exert the first pressure force on the first lace and translation of the first lace is facilitated both in the first forwards direction and in the first backwards direction.

The Lace Ratcheting System (LRS) 1 also includes a second lace ratcheting device which comprises a second turning gate 2B, a second blade 4B and a second channel which extends from the second channel entrance 19B to the second channel exit 11B. The second channel is configured to carry through a segment of the second lace. The second channel extends in a second forwards direction from a second channel entrance 19B towards a second channel exit 11B. Where the second backwards direction is the opposite direction to the second forwards direction. The second channel further comprises a second gripping floor 10B being adapted with a second smooth gripping surface configured to engage the second lace.

The second lace ratcheting device has a second active state and a second inactive state. While in the second active state, the second lace ratcheting device is configured to restrict translation of the second lace in the second channel in the second backwards direction and to facilitate translation of the second lace in the second forwards direction in the second channel. While in the second inactive state, the second lace ratcheting device is configured to facilitate translation of the second lace both in the second forwards direction and in the second backwards direction.

The second turning gate 2B is rotationally engaged with the second channel at a second axle 14B, wherein the second turning gate 2B comprises a second blade holder 25B attached to a second elastic member 24B. The second blade 4B includes a second blade front 41B and a second blade rear 42B. The second blade 4B is installed into the second blade holder 25B such that the second blade front 41B protrudes at a second front of the second blade holder 25B. The second turning gate 2B is diagonally installed in the second channel such that a second straight line emanating from the second blade front 41B and passing through the second axle 14B is at a second obtuse angle with respect to the second forwards direction. The second blade front 41B is placed within the second channel opposite the second gripping floor 10B. The second blade front 41B is placed opposite the second gripping floor 10B such that there is a second gap between the second blade front 41B and the second gripping surface 10B, where the second lace is configured to pass through the second gap.

The second turning gate 2B is configured to be turned in a second backwards turning direction when the second blade front 41B is being moved in the second backwards direction. The second turning gate 2B is configured to be turned in a second forwards turning direction when the second blade front 41B is being moved in the second forwards direction. The second turning gate 2B is configured to reduce the second gap and to increase a second pressure force exerted by the second blade front 41B on the second lace when the second turning gate 2B is being turned increasingly in the second backwards turning direction. Furthermore, the second turning gate 2B is configured to increase the second gap and to reduce the second pressure force exerted by the second blade front 41B on the second lace when the second turning gate 2B is being turned increasingly in the second forwards turning direction.

At the second active state, the second blade front 41B is configured to exert the second pressure force on the second lace and the second blade front 41B is configured to frictionally engage the second lace and to turn the second turning gate 2B in the second forwards turning direction when the second lace is translated in the second forwards direction. In addition, at the second active state the second blade front 41B is configured to frictionally engage the second lace and to turn the second turning gate 2B in the second backwards turning direction when the second lace is translated in the second backwards direction.

While at the second active state, the second turning gate 2B is configured to facilitate second forwards translation of the second lace by turning increasingly in the second forwards turning direction and consequently diminishing the second pressure force of the second blade front 41B on the second lace. While at the second active state, the second turning gate 2B is configured to restrict second backwards translation of the second lace by increasingly turning in the second backwards turning direction and consequently increasing the second pressure force of the second blade front 41B on the second lace. At the second inactive state of the second lace ratcheting device, the second gap is being increased and the second blade front 41B is configured not to exert the second pressure force on the second lace and translation of the second lace is facilitated both in the second forwards direction and in the second backwards direction.

The first axle 14A is fitted into a first bearing 23A and the second axle 14B is fitted into a second bearing 23B. The first elastic member 24A is structured as a first resilient plate which acts as a first flat spring that is attached to the first blade holder 25A. While in the first active state, the first resilient plate 24A is configured to be preloaded at a first bent state and is configured to apply a first backwards turning force on the first turning gate 2A. The first backwards turning force is configured to turn the first turning gate 2A in the first backwards turning direction, which is configured to reduce the first gap and to increase the first pressure force on the first lace. At the first active state the first blade front 41A is configured to apply the first pressure force on the first lace. While in the first active state, the first resilient plate 24A is held in the first bent state by a latch 12 which is resiliently attached by a resilient member 20 to the joint gripping floor 10C when manually pulled, the latch 12 is configured to release the first resilient plate 24A from the first bent state into a first released state. When the first resilient plate 24A is at the first released state, it is configured to diminish the first backwards turning force applied on the first turning gate 2A and to switch the first lace ratcheting device from the first active state into the first inactive state.

The second elastic member 24B is structured as a second resilient plate 24B which acts as a second flat spring that is attached to the second blade holder 25B. While in the second active state, the second resilient plate 24B is configured to be preloaded at a second bent state and is configured to apply a second backwards turning force on the second turning gate 2B, wherein the second backwards turning force is configured to turn the second turning gate 2B in the second backwards turning direction, which is configured to reduce the second gap and to apply the second pressure force on the second lace. At the second active state the second blade front 41B is configured to apply the second pressure force on the second lace.

While in the second active state, the second resilient plate 24B is held in the second bent state by a latch 12 which is resiliently attached to the joint gripping floor 10C by a resilient member 20. When manually pulled, the latch 12 is configured to release the second resilient plate 24B from the second bent state into a second released state. When the second resilient plate is at the second released state, it is configured to diminish the second backwards turning force applied on the second turning gate 2B and to switch the second lace ratcheting device from the second active state into the second inactive state.

The first gripping floor 10A is joined with the second gripping floor 10B to form a joint gripping floor 10C. Wherein the joint gripping floor 10C is attached to: a right wall 5A, to a right diagonal wall 5C, to a left wall 5B, to a left diagonal wall 5D and to a center wall 5E. The first channel entrance 19A is situated between the right wall 5A and the center wall 5E. The second channel entrance 19B is situated between the left wall 5B and the center wall 5E. The first channel exit 11A is situated at a right opening 11A in the right diagonal 5C wall. The second channel exit 11B is situated at a left opening 11B in the left diagonal wall 5D.

The first axle 14A is split into two first half axles: a first right half axle 14A and a first left half axle 14A. The first right half axle 14A is attached to the right wall 5A and the first left half axle 14A is attached to the center wall 5E. The second axle 14B is split into two second half axles: a second right half axle 14B and a second left half axle 14B. The second right half axle 14B is attached to the center wall 5E and the second left half axle 14B is attached to the left wall 5B.

The first turning gate 2A has a first bearing 23A with two openings: a first right bearing opening 23A and a first left bearing opening 23A. Where the first right bearing opening 23A is mounted on the first right half axle 14A and the first left bearing opening 23A is mounted on the first left half axle 14A.

The second turning gate 2B has a second bearing 23B with two openings: a second right bearing opening 23B and a second left bearing opening 23B. Where the second right bearing opening 23B is mounted on the second right half axle 14B and the second left bearing opening 23B is mounted on the second left half axle 14B. The first blade 4A is tapered towards the first blade front 41A, where the first blade front 41A is adapted with a first smooth side 43A (shown in FIG. 3).

The first blade front 41A is configured to concentrate the first pressure force on the first lace when the first turning gate 2A is turned in the first backwards turning direction while the first front 41A engages the first lace. The first smooth side 43A is configured to engage the first lace when the first turning gate 2A is turned in the first forwards turning direction. The first smooth side 43A is configured to reduce the first lace wear while the first turning gate 2A is turned in the first forwards turning direction and the first lace is translated in the first forwards direction.

The second blade 4B is tapered towards the second blade front 41B. Where the second blade front 41B is adapted with a second smooth side 43B. The second blade front 41B is configured to concentrate the second pressure force on the second lace when the second turning gate 2B is turned in the second backwards turning direction while the second blade front 41B engages the second lace.

The second smooth side 43B is configured to engage the second lace when the second turning gate 2B is turned in the second forwards turning direction. The second smooth side 43B is configured to reduce the second lace wear while the second turning gate 2B is turned in the second forwards turning direction and the second lace is translated in the second forwards direction.

The first smooth gripping surface 10A is configured to reduce the first lace wear when the first lace is translated in first forwards direction at the first active state and also when the first lace is translated in the first inactive state. The second smooth gripping surface 10B is configured to reduce the second lace wear when the second lace is translated in the second forwards direction at the second active state and also when the second lace is translated in the second inactive state.

The lace ratcheting system comprises a leaf spring 13 which is attached to the joint gripping floor 10C at a leaf spring lower end. Where the leaf spring upper end is unattached and is situated below the first resilient plate 24A and also below the second resilient plate 24B. The first resilient plate 24A is configured to be pressed against the leaf spring 13 upper end and to bend the leaf spring when the first resilient plate is being rotated downwards towards the joint gripping floor 10C.

Where the second resilient plate 24B is configured to be pressed against the leaf spring upper end and to bend the leaf spring 13 when the second resilient plate 24B is being rotated downwards towards the joint gripping floor 10C. When the first lace ratcheting device is at the first active state and the latch 12 is being pulled, the first resilient plate 24A which is at the first bent state is configured to be released and to turn the first turning gate 2A in the first forwards turning direction. Meanwhile, the leaf spring 13 which was bent is also configured to be released and to facilitate turning upwards the first resilient plate 24A which also turns the first turning gate 2A in the first forwards turning direction towards the first inactive state.

When the second lace ratcheting device is at the second active state and the latch 12 is being pulled, the second resilient plate 24B which is at the second bent state is configured to be released and to turn the second turning gate 2B in the second forwards turning direction. meanwhile, the leaf spring 13 which was bent also is configured to be released and to facilitate turning upwards the second resilient plate 24B which also turns the second turning gate 2B in the second forwards turning direction towards the second inactive state.

The first front side of the first resilient plate 24A is joined to a second front side of the second resilient plate 24B by a bar 21 the bar protrudes upwards and facilitates anchoring it down by a hook 15 attached to the latch 12 which is connected resiliently to the joint floor 10C by the member 20. The bar 21 also facilitates simultaneous switching of the first lace ratcheting device and the second lace ratcheting device into the first active state and into the second active state respectively by manually pressing the bar 21 down and anchoring it to the latch 12. The bar 21 also facilitates simultaneous switching of the first lace ratcheting device and the second lace ratcheting device into the first inactive state and into the second inactive state respectively by manually releasing the anchored bar 21 from the latch 12. The first resilient plate 24A and the second resilient plate 24B have been separately attached to a first shelve 22A and a second shelve 22B respectively. Wherein the first shelve 22A facilitates manual upwards turning of the first resilient plate 24A and the second shelve 22B facilitates manual upwards turning of the second resilient plate 24B.

The first resilient plate 24A is being configured also to serve as a first lever for manually switching the first lace ratcheting device from the first inactive state into the first active state by manually turning down the first resilient plate 24A which is configured to turn the first turning gate 2A in the first backwards turning direction while reducing the first gap.

The second resilient plate 24B is being configured also to serve as a second lever for manually switching the second lace ratcheting device from the second active state into the second inactive state by manually turning up the second resilient plate 24B which is configured to turn the second turning gate 2B in the second forwards turning direction and to increase the second gap. The second resilient plate 24B is being configured also to serve as a second lever for manually switching the second lace ratcheting device from the second inactive state into the second active state by manually turning down the second resilient plate 24B which is configured to turn the turning gate in the second backwards turning direction and to reduce the second gap.

The lace ratcheting system also includes a lace clamp which is configured for clamping at least one lace end. The lace clamp comprising a clamp cradle constructed by joining three walls: 18A, 18B, 18C. The cradle is configured for holding at least one lace end. The clamp has a clamping mechanism 3 configured to switch the clamp from an open state to a closed state and from the closed state to the open state. At the open state the lace ends housed in the clamp cradle are not clamped and can be released. At the closed state the lace ends housed in the clamping cradle are clamped and tied to the clamp cradle. The clamp cradle comprises a horizontal wall 18B attached to a frontal vertical wall 18C and to a rear vertical wall 18A which also is attached to the horizontal wall 18B. The clamp cradle further comprises: a couple of upwards sharp wedges 16 pointing upwards and attached to the horizontal 18B wall which also has a vertical screwing threaded aperture 17. The clamping mechanism comprises a flat cover 3 with a bottom plane, a couple of downwards sharp wedges 32 pointing downwards and attached to the bottom plane. The flat cover 3 also includes a vertical passing aperture 31 that is aligned with the vertical screw threaded aperture 17. The clamping mechanism also includes a screw 6 with threading which fits the screw treaded aperture 17 and passes through the passing aperture 31.

The clamping mechanism is configured to switch the clamp from the open state to the closed state by fastening the screw 6 which presses down the flat cover 3 with the attached downwards sharp wedges 32 that are pressed on top of the lace ends. The laces ends which rest in the clamp cradle on top of the couple of upwards sharp wedges 16, are being squeezed between the couple of upwards sharp wedges 16 and the couple of downwards sharp wedges 32 and so are clamped and tied to the clamp cradle.

The clamping mechanism also is configured to switch the clamp from the closed state to the open state by unfastening the screw 6 which releases upwards the flat cover 3 with the attached downwards sharp wedges 32 situated on top of the lace ends. At the open state the lace ends which rest in the clamp cradle on top of the couple of upwards sharp wedges 16, are not being squeezed between the couple of upwards sharp wedges 16 and the couple of downwards sharp wedges 32 and are not clamped and not tied to the clamp cradle. The clamp cradle is coupled with the lace ratcheting system 1 by attaching the frontal vertical wall 18C to a rear edge of the joint gripping floor 10C and also to the center wall 5E.

Figure 6:
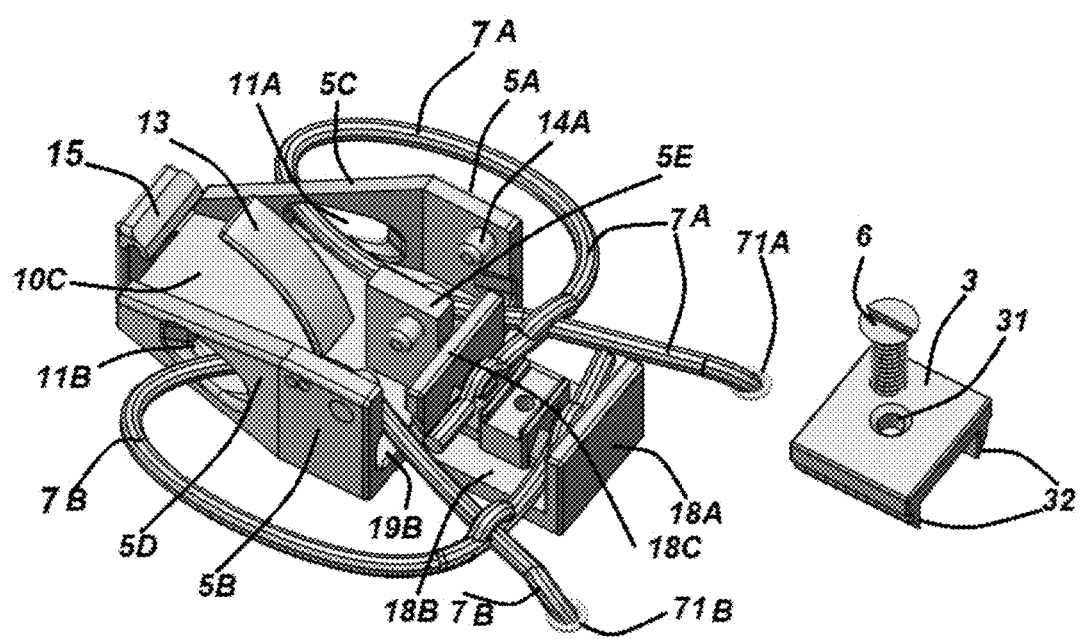
FIG. 6 depicts a 3D isometric top side view of the parts of an embodiment of a disassembled two joined LRDs (Lace Ratcheting Devices) in a parallel configuration namely a Lace Ratcheting System (LRS). The turning gates are not shown in FIG. 6. At their rear side, the joined LRDs are coupled with a lace clamp which ties the loose front ends of the laces.
Figure 7:
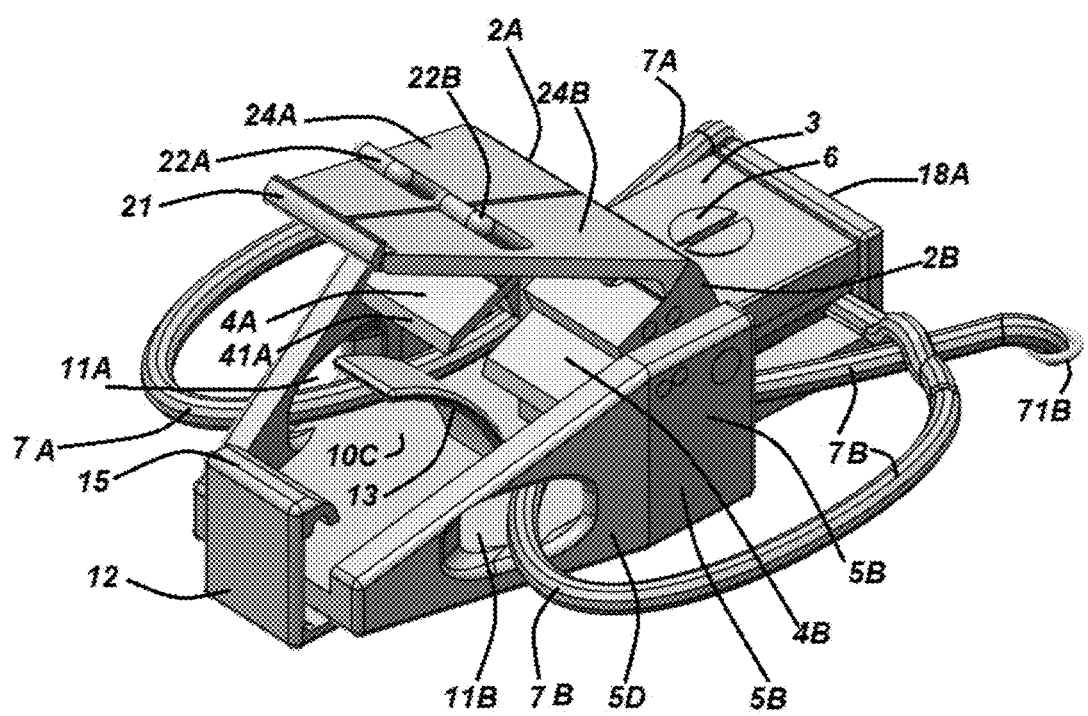
FIG. 7 depicts a 3D isometric top side view of the parts of an embodiment of a disassembled two joined LRDs (Lace Ratcheting Devices) in a parallel configuration namely a Lace Ratcheting System (LRS). At their rear side, the joined LRDs are coupled with a lace clamp which ties the loose front ends of the laces.

FIG. 6 depicts a 3D isometric top side view of the parts of an embodiment of a disassembled two joined LRDs (Lace Ratcheting Devices) in a parallel configuration namely a Lace Ratcheting System (LRS). The turning gates are not shown in FIG. 6. At their rear side, the joined LRDs are coupled with a lace clamp which ties the loose front ends of the laces. FIG. 6 also depicts a couple of laces 7A and 7B which demonstrate the how they are laid in the channels of the LRS and in the Clamp. The laces are not clamped in FIG. 6. FIG. 7 depicts a 3D isometric top side view of the parts of an embodiment of a disassembled two joined LRDs (Lace Ratcheting Devices) in a parallel configuration namely a Lace Ratcheting System (LRS). At their rear side, the joined LRDs are coupled with a lace clamp which ties the loose front ends of the laces. FIG. 7 also depicts a couple of laces which demonstrate the how they are laid in the channels of the LRS and in the Clamp. The laces are clamped in FIG. 7.

Figure 8:
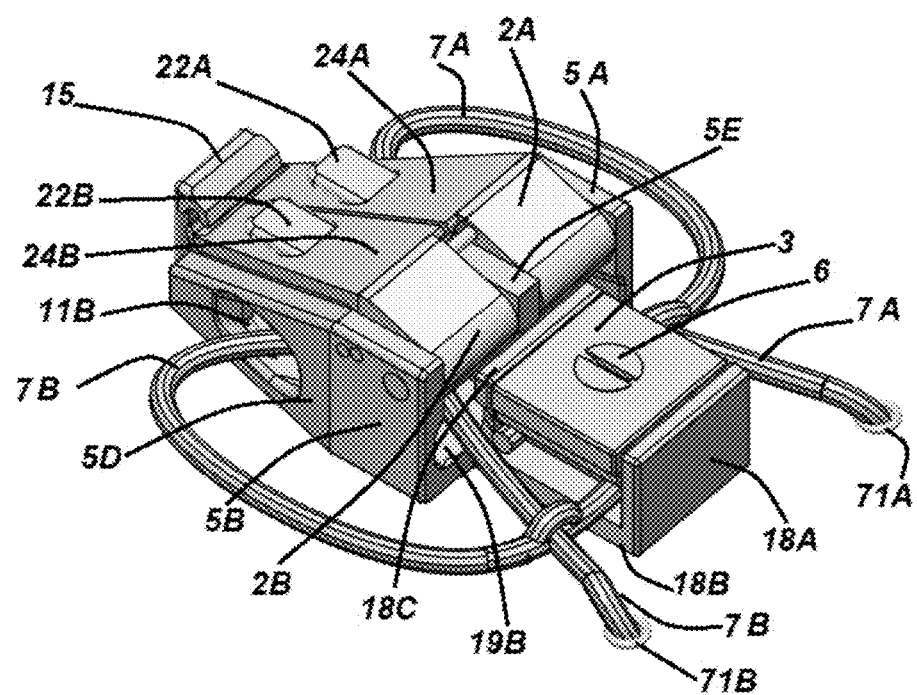
FIG. 8 depicts a 3D isometric top rear view of the parts of an embodiment of an assembled two joined LRDs (Lace Ratcheting Devices) in a parallel configuration namely a Lace Ratcheting System (LRS). At their rear side, the joined LRDs are coupled with a lace clamp which ties the loose front ends of the laces.

FIG. 8 depicts a 3D isometric top rear view of the parts of an embodiment of an assembled two joined LRDs (Lace Ratcheting Devices) in a parallel configuration namely a Lace Ratcheting System (LRS). At their rear side, the joined LRDs are coupled with a lace clamp which ties the loose front ends of the laces. FIG. 8 also depicts a couple of laces 7A and 7B which demonstrate the how they are laid in the channels of the LRS and in the Clamp. The turning gates 2A and 2B are in active state and the laces are clamped in FIG. 8. The disassembled parts' orientations correspond to their actual orientations in the assembled LRS. Hence, the following Section [0063] pertains to FIG. 6-FIG. 8.

In FIG. 6-FIG. 8, the lace ratcheting system is placed on a top of a footwear item and fastens the first lace 7A and the second lace 7B which emerge from the footwear item's lace apertures 71A and 71B respectively. The first lace 7A emerges from the footwear lace apertures 71A below and enters the first channel via the first channel entrance 19A and the second lace 7B emerges from the footwear lace apertures 71B below and enters the second channel via the second channel entrance 19B. The lace ratcheting system 1 is configured to lie flattened on top of the footwear and to resist turning of the lace ratcheting system 1 at forwards turning direction or at backwards turning direction since the first cannel entrance 19A and the second channel entrance 19B are placed at the a rear edge of the joint gripping floor which is situated at the middle of the lace ratcheting system 1 since it is joined at the rear side of its joint gripping floor 10C with the vertical wall 18C of the clamp. Turning of the lace ratcheting system 1 at forwards turning direction or at backwards turning direction is resisted since it raises both the first channel entrance 19A and the second channel entrance 19B above the top of the footwear item and pulls upwards the fastened first lace 7A and the fastened second lace 7B.

Figure 9:
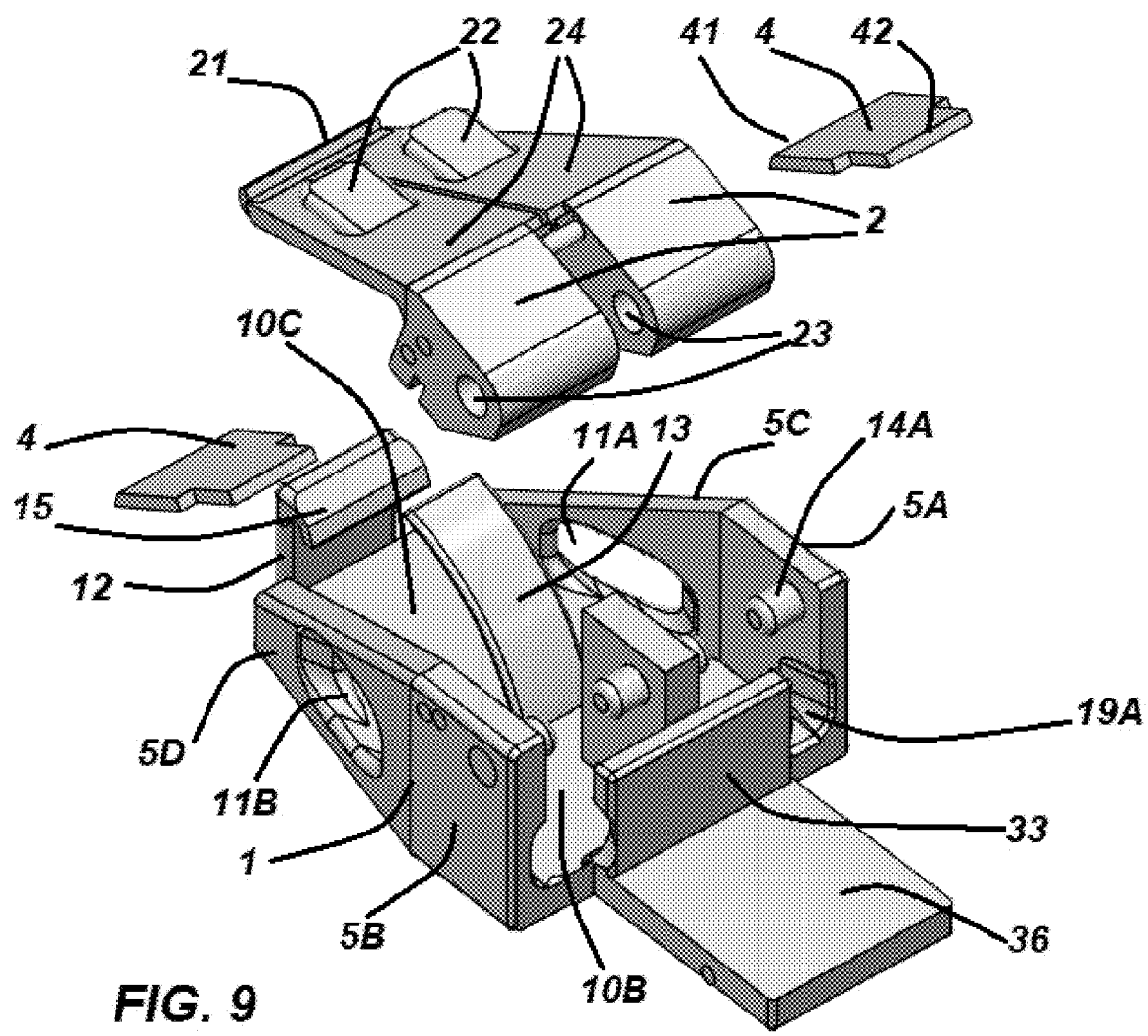
FIG. 9 illustrates a 3D isometric top rear view of the parts of an embodiment of a disassembled two joined LRDs (Lace Ratcheting Devices) in a parallel configuration namely a Lace Ratcheting System (LRS). At their rear side, the joined LRDs are coupled with a horizontal floor n extension to the join gripping floor. The disassembled parts' orientations correspond to their actual orientations in the assembled LRS.

FIG. 9 illustrates a 3D isometric top rear view of the parts of an embodiment of a disassembled two joined LRDs (Lace Ratcheting Devices) in a parallel configuration namely a Lace Ratcheting System (LRS) 1. At their rear side, the joined LRDs are coupled at the rear edge of the joint gripping floor 10C with a horizontal floor extension 36 and a vertical wall extension 33. The disassembled parts' orientations correspond to their actual orientations in the assembled LRS 1.

The lace ratcheting system (LRS) 1 is placed on a top of a footwear item and fastens the first lace 7A and the second lace 7B which emerge from the footwear's apertures below. Wherein the first lace 7A emerges from the footwear aperture 71A below and enters the first channel via the first channel entrance 19A and the second lace 7B emerges from the footwear aperture 71B below and enters the second channel via the second channel entrance 19B. The lace ratcheting system 1 is configured to lie flattened on top of the footwear and to resist turning of the lace ratcheting system at forwards turning direction or at backwards turning direction since the first cannel entrance 19A and the second channel entrance 19B are placed at the rear edge of the joint gripping floor 10C which is situated at the middle of the lace ratcheting system 1 since the rear edge of the joint gripping floor 10C is joined at the rear side with the horizontal rear floor extension 36. Turning of the lace ratcheting system 1 at forwards turning direction or at backwards turning direction is resisted since it raises both the first channel entrance 19A and the second channel entrance 19B above the top of the footwear and pulls upwards the fastened first lace 7A and the fastened second lace 7B.

Referring to FIG. 5 of the lace ratcheting system 1, wherein the first blade 4A is made of a flat sheet metal. Wherein the first blade 4A has a first rear blade 42A and the first blade front 41A. The first blade front 41A is tapered and also wider than the first rear blade 42A which is configured to be installed into a first blade holder 25A of the first turning gate 2A. The first blade holder 25A also has a first stamping aperture 26A configured for stamping the first rear blade in order to prevent it from falling out after its installment in the first blade holder 25A.

Referring to FIG. 5 of the lace ratcheting system 1, wherein the second blade 4B is made of a flat sheet metal. Wherein the second blade 4B has a second rear blade 42B and the second blade front 41B. The second blade front 41B is tapered and also wider than the second rear blade 42B which is configured to be installed into a second blade holder 25B in the second turning gate 2B. The second blade holder 25B also has a second stamping aperture 26B configured for stamping the second rear blade in order to prevent it from falling out after its installment in the second blade holder 25B.

What is claimed is:

1. A lace ratcheting system configured for fastening and releasing a couple of laces;
    wherein the couple of laces comprises: a first lace and a second lace;
    the lace ratcheting system comprising: a first lace ratcheting device and a second lace ratcheting device; the first lace ratcheting device further comprising:
    a first turning gate, a first blade and
    a first channel being configured to carry through a first segment of the first lace;
    wherein the first channel extends in a first forwards direction from a first channel entrance towards a first channel exit; wherein, a first backwards direction is in an opposite direction to the first forwards direction;
    the first channel further comprises a first gripping floor being adapted with a first gripping surface configured to engage the first lace;
    the first lace ratcheting device has a first active state and a first inactive state;

while in the first active state, the first lace ratcheting device is configured to restrict translation of the first lace in the first channel in the first backwards direction and to facilitate translation of the first lace in the first forwards direction in the first channel;

while in the first inactive state, the first lace ratcheting device is configured to facilitate translation of the first lace both in the first forwards direction and in the first backwards direction;

the first turning gate is rotationally engaged with the first channel at a first fulcrum, wherein the first turning gate comprises a first blade holder attached to a first elastic member;

wherein the first blade includes a first blade front;

wherein the first blade is installed into the first blade holder such that the first blade front protrudes at a first front of the first blade holder;

the first turning gate is diagonally installed in the first channel such that a first straight line emanating from the first blade front and passing through the first fulcrum is at a first obtuse angle with respect to the first forwards direction; wherein the first blade front is placed within the first channel opposite the first gripping surface; wherein the first blade front is placed opposite the first gripping surface such that there is a first gap between the first blade front and the first gripping surface; wherein the first lace is configured to pass through the first gap;

the first turning gate is configured to be turned in a first backwards turning direction when the first blade front is being moved in the first backwards direction;

the first turning gate is configured to be turned in a first forwards turning direction when the first blade front is being moved in the first forwards direction;

wherein, the first turning gate is configured to reduce the first gap and to increase a first pressure force exerted by the first blade front on the first lace when the first turning gate is being turned increasingly in the first backwards turning direction;

wherein the first turning gate is configured to increase the first gap and to reduce the first pressure force exerted by the first blade front on the first lace when the first turning gate is being turned increasingly in the first forwards turning direction;

at the first active state, the first blade front is configured to exert the first pressure force on the first lace and the first blade front is configured to frictionally engage the first lace and to turn the first turning gate in the first forwards turning direction when the first lace is translated in the first forwards direction;

in addition, at the first active state the first blade front is configured to frictionally engage the first lace and to turn the first turning gate in the first backwards turning direction when the first lace is translated in the first backwards direction;

while at the first active state, the first turning gate is configured to facilitate first forwards translation of the first lace by turning increasingly in the first forwards turning direction and consequently diminishing the first pressure force of the first blade front on the first lace;

while at the first active state, the first turning gate is configured to restrict first backwards translation of the first lace by increasingly turning in the first backwards turning direction and consequently increasing the first pressure force of the first blade front on the first lace;

at the first inactive state of the first lace ratcheting device, the first gap is being increased and the first blade front is configured not to exert the first pressure force on the first lace and translation of the first lace is facilitated both in the first forwards direction and in the first backwards direction;

the second lace ratcheting device further comprising:

a second turning gate, a second blade and a second channel being configured to carry through a second segment of the second lace;

wherein the second channel extends in a second forwards direction from a second channel entrance towards a second channel exit; wherein, a second backwards direction is in an opposite direction to the second forwards direction;

the second channel further comprises a second gripping floor being adapted with a second gripping surface configured to engage the second lace;

the second lace ratcheting device has a second active state and a second inactive state;

while in the second active state, the second lace ratcheting device is configured to restrict translation of the second lace in the second channel in the second backwards direction and to facilitate translation of the second lace in the second forwards direction in the second channel;

while in the second inactive state, the second lace ratcheting device is configured to facilitate translation of the second lace both in the second forwards direction and in the second backwards direction;

the second turning gate is rotationally engaged with the second channel at a second fulcrum, wherein the second turning gate comprises a second blade holder attached to a second elastic member;

wherein the second blade includes a second blade front;

wherein the second blade is installed into the second blade holder such that the second blade front protrudes at a second front of the second blade holder;

the second turning gate is diagonally installed in the second channel such that a second straight line emanating from the second blade front and passing through the second fulcrum is at a second obtuse angle with respect to the second forwards direction;

wherein the second blade front is placed within the second channel opposite the second gripping surface; wherein the second blade front is placed opposite the second gripping surface such that there is a second gap between the second blade front and the second gripping surface; wherein the second lace is configured to pass through the second gap;

the second turning gate is configured to be turned in a second backwards turning direction when the second blade front is being moved in the second backwards direction; the second turning gate is configured to be turned in a second forwards turning direction when the second blade front is being moved in the second forwards direction;

wherein, the second turning gate is configured to reduce the second gap and to increase a second pressure force exerted by the second blade front on the second lace when the second turning gate is being turned increasingly in the second backwards turning direction;

wherein the second turning gate is configured to increase the second gap and to reduce the second pressure force exerted by the second blade front on the second lace when the second turning gate is being turned increasingly in the second forwards turning direction;

at the second active state, the second blade front is configured to exert the second pressure force on the second lace and the second blade front is configured to frictionally engage the second lace and to turn the second turning gate in the second forwards turning direction when the second lace is translated in the second forwards direction;

in addition, at the second active state the second blade front is configured to frictionally engage the second lace and to turn the second turning gate in the second backwards turning direction when the second lace is translated in the second backwards direction;

while at the second active state, the second turning gate is configured to facilitate second forwards translation of the second lace by turning increasingly in the second forwards turning direction and consequently diminishing the second pressure force of the second blade front on the second lace;

while at the second active state, the second turning gate is configured to restrict second backwards translation of the second lace by increasingly turning in the second backwards turning direction and consequently increasing the second pressure force of the second blade front on the second lace;

at the second inactive state of the second lace ratcheting device, the second gap is being increased and the second blade front is configured not to exert the second pressure force on the second lace and translation of the second lace is facilitated both in the second forwards direction and in the second backwards direction.

2. The lace ratcheting system of claim 1, wherein the first fulcrum comprises a first axle which is fitted into a first bearing;

wherein, the second fulcrum comprises a second axle which is fitted into a second bearing.

3. The first lace ratcheting system of claim 1, wherein the first gripping floor is joined with the second gripping floor to form a joint gripping floor;

wherein the first elastic member is structured as a first resilient plate which acts as a first flat spring that is attached to the first blade holder;

while in the first active state, the first resilient plate is configured to be preloaded at a first bent state and is configured to apply a first backwards turning force on the first turning gate; wherein the first backwards turning force is configured to turn the first turning gate in the first backwards turning direction which is configured to reduce the first gap and to apply the first pressure force on the first lace; wherein at the first active state the first blade front is configured to apply the first pressure force on the first lace;

while in the first active state, the first resilient plate is held in the first bent state by a latch which is resiliently attached to the joint gripping floor; when manually pulled, the latch is configured to release the first resilient plate from the first bent state into a first released state; when the first resilient plate is at the first released state, it is configured to diminish the first backwards turning force applied on the first turning gate and to switch the first lace ratcheting device from the first active state into the first inactive state;

wherein the second elastic member is structured as a second resilient plate which acts as a second flat spring that is attached to the second blade holder; while in the second active state, the second resilient plate is configured to be preloaded at a second bent state and is configured to apply a second backwards turning force on the second turning gate; wherein the second backwards turning force is configured to turn the second turning gate in the second backwards turning direction, which is configured to reduce the second gap and to apply the second pressure force on the second lace; wherein at the second active state the second blade front is configured to apply the second pressure force on the second lace;

while in the second active state, the second resilient plate is held in the second bent state by the latch; when manually pulled, the latch is configured to release the second resilient plate from the second bent state into a second released state;

when the second resilient plate is at the second released state, it is configured to diminish the second backwards turning force applied on the second turning gate and to switch the second lace ratcheting device from the second active state into the second inactive state.

4. The first lace ratcheting system of claim 3, wherein the joint gripping floor is attached to: a right wall, to a right diagonal wall, to a left wall, to a left diagonal wall and to a center wall; wherein the first channel entrance is situated between the right wall and the center wall; wherein the second channel entrance is situated between the left wall and the center wall; wherein the first channel exit is situated at a right opening in the right diagonal wall; wherein the second channel exit is situated at a left opening in the left diagonal wall;

the first axle is split into two first half axles: a first right half axle and a first left half axle; wherein the first right half axle is attached to the right wall and the first left half axle is attached to the center wall; the second axle is split into two second half axles: a second right half axle and a second left half axle; wherein the second right half axle is attached to the center wall and the second left half axle is attached to the left wall;

the first turning gate has a first bearing with two openings: a first right bearing opening and a first left bearing opening; wherein the first right bearing opening is mounted on the first right half axle and the first left bearing opening is mounted on the first left half axle;

the second turning gate has a second bearing with two openings: a second right bearing opening and a second left bearing opening; wherein the second right bearing opening is mounted on the second right half axle and the second left bearing opening is mounted on the second left half axle.

5. The first lace ratcheting system of claim 1, wherein the first blade is tapered towards the first blade front; wherein the first blade front is adapted with a first smooth side;

wherein, the first blade front is configured to concentrate the first pressure force on the first lace when the first turning gate is turned in the first backwards turning direction while the first blade front engages the first lace;

wherein, the first smooth side is configured to engage the first lace when the first turning gate is turned in the first forwards turning direction;

wherein, the first smooth side is configured to reduce the first lace wear while the first turning gate is turned in the first forwards turning direction and the first lace is translated in the first forwards direction;

wherein the second blade is tapered towards the second blade front; wherein the second blade front is adapted with a second smooth side;

wherein, the second blade front is configured to concentrate the second pressure force on the second lace when the second turning gate is turned in the second backwards turning direction while the second blade front engages the second lace;

wherein, the second smooth side is configured to engage the second lace when the second turning gate is turned in the second forwards turning direction;

wherein, the second smooth side is configured to reduce the second lace wear while the second turning gate is turned in the second forwards turning direction and the second lace is translated in the second forwards direction.

6. The lace ratcheting system of claim 1, wherein the first gripping floor is adapted with a first smooth gripping surface; wherein the second gripping floor is adapted with a second smooth gripping surface;

wherein, the first smooth gripping surface is configured to reduce the first lace wear when the first lace is fastened at the first active state and also when the first lace is translated at the first active state and also when the first lace is translated in the first inactive state;

wherein, the second smooth gripping surface is configured to reduce the second lace wear when the second lace is fastened at the second active state and also when the second lace is translated at the second active state and also when the second lace is translated in the second inactive state.

7. The lace ratcheting system of claim 3, wherein the lace ratcheting system comprises a leaf spring which is attached to the joint gripping floor at a leaf spring lower end; wherein a leaf spring upper end is unattached and is situated below the first resilient plate and also below the second resilient plate;

wherein the first resilient plate is configured to be pressed against the leaf spring upper end and to bend the leaf spring when the first resilient plate is being rotated downwards towards the joint gripping floor;

wherein the second resilient plate is configured to be pressed against the leaf spring upper end and to bend the leaf spring when the second resilient plate is being rotated downwards towards the joint gripping floor;

when the first lace ratcheting device is at the first active state and the latch is being pulled, the first resilient plate which is at the first bent state is configured to be released and to turn the first turning gate in the first forwards turning direction; meanwhile, the leaf spring which was bent is also configured to be released and to facilitate turning upwards the first resilient plate which also turns the first turning gate in the first forwards turning direction towards the first inactive state;

when the second lace ratcheting device is at the second active state and the latch is being pulled, the second resilient plate which is at the second bent state is configured to be released and to turn the second turning gate in the second forwards turning direction; meanwhile, the leaf spring which was bent also is configured to be released and to facilitate turning upwards the second resilient plate which also turns the second turning gate in the second forwards turning direction towards the second inactive state.

8. The lace ratcheting system of claim 3, wherein a first front side of the first resilient plate is joined to a second front side of the second resilient plate by a bar; wherein the bar protrudes upwards and facilitates anchoring it down by a hook attached to the latch; the bar also facilitates simultaneous switching of the first lace ratcheting device and the second lace ratcheting device into the first active state and into the second active state respectively by manually pressing the bar down and anchoring it to the hook; the bar also facilitates simultaneous switching of the first lace ratcheting device and the second lace ratcheting device into the first inactive state and into the second inactive state respectively by manually releasing the anchored bar from the hook.

9. The lace ratcheting system of claim 3, wherein the first resilient plate have been attached to a first shelve and the second resilient plate have been attached to a second shelve; wherein the first shelve facilitates manual upwards turning of the first resilient plate; wherein the second shelve facilitates manual upwards turning of the second resilient plate.

10. The lace ratcheting system of claim 3, wherein the first resilient plate is being configured also to serve as a first lever for manually switching the first lace ratcheting device from the first active state into the first inactive state by manually turning up the first resilient plate which is configured to turn the first turning gate in the first forwards turning direction and to increase the first gap;

wherein the first resilient plate is being configured also to serve as a first lever for manually switching the first lace ratcheting device from the first inactive state into the first active state by manually turning down the first resilient plate which is configured to turn the first turning gate in the first backwards turning direction and to reduce the first gap;

wherein the second resilient plate is being configured also to serve as a second lever for manually switching the second lace ratcheting device from the second active state into the second inactive state by manually turning up the second resilient plate which is configured to turn the second turning gate in the second forwards turning direction and to increase the second gap;

wherein the second resilient plate is being configured also to serve as a second lever for manually switching the second lace ratcheting device from the second inactive state into the first active state by manually turning down the second resilient plate which is configured to turn the turning gate in the second backwards turning direction and to reduce the second gap.

11. The lace ratcheting system of claim 4, further comprising a lace clamp which is configured for clamping at least one lace end;

wherein, the lace clamp comprising:
a clamp cradle configured for holding at least one lace end;
a clamping mechanism configured to switch the clamp from an open state to a closed state and from the closed state to the open state;

wherein, at the open state the lace ends housed in the clamp cradle are not clamped and can be released;

wherein, at the closed state the lace ends housed in the clamping cradle are clamped and tied to the clamp cradle.

12. The lace clamp of claim 11, wherein the clamp cradle comprising:
a horizontal wall attached to a frontal vertical wall and a rear vertical wall also attached to the horizontal wall;

the clamp cradle further comprises: a couple of upwards sharp wedges pointing upwards and attached to the horizontal wall which also has a vertical screw threaded aperture;

the clamping mechanism comprising: a flat cover with a bottom plane, a couple of downwards sharp wedges pointing downwards and attached to the bottom plane; the flat cover also includes a vertical passing aperture that is aligned with the vertical screw threaded aperture; the clamping mechanism also includes a screw with threading which fits the screw treaded aperture and passes through the passing aperture;

the clamping mechanism is configured to switch the clamp from the open state to the closed state by fastening the screw which presses down the flat cover with the attached downwards sharp wedges that are pressed on top of the lace ends;

the laces ends which rest in the clamp cradle on top of the couple of upwards sharp wedges, are being squeezed between the couple of upwards sharp wedges and the couple of downwards sharp wedges and are clamped and tied to the clamp cradle;

the clamping mechanism also is configured to switch the clamp from the closed state to the open state by unfastening the screw which releases upwards the flat cover with the attached downwards sharp wedges situated on top of the lace ends;

wherein at the open state the lace ends which rest in the clamp cradle on top of the couple of upwards sharp wedges, are not being squeezed between the couple of upwards sharp wedges and the couple of downwards sharp wedges and are not clamped and not tied to the clamp cradle.

13. The lace ratcheting system of claim 12, wherein the clamp cradle is coupled with the lace ratcheting system by attaching the frontal vertical wall to a rear edge of the joint gripping floor and also attaching the frontal vertical wall to the center wall.

14. The lace ratcheting system of claim 13, wherein the lace ratcheting system is placed on a top of a footwear item and fastens the first lace and the second lace which emerge from the footwear item below; wherein the first lace emerges from the footwear item below and enters the first channel via the first channel entrance and the second lace emerges from the footwear item below and enters the second channel via the second channel entrance; the lace ratcheting system is configured to lie flattened on top of the footwear item and to resist turning of the lace ratcheting system at the forwards turning direction or at the backwards turning direction since the first cannel entrance and the second channel entrance are situated between the rear side of the lace ratcheting system and the front side of the horizontal floor;

the lace ratcheting system is configured to resist turning at forwards turning direction or at backwards turning direction since upon turning at forwards turning direction or at backwards turning direction the lace ratcheting system is configured to raise both the first channel entrance and the second channel entrance above the top of the footwear item and to pull upwards the fastened first lace and the fastened second lace.

15. The lace ratcheting system of claim 4, wherein the lace ratcheting system further comprising a horizontal rear floor extension and a rear vertical wall extension; the horizontal rear floor extension and the rear vertical wall extension are attached to the rear edge of the joint gripping floor and to the center wall.

16. The lace ratcheting system of claim 15, wherein the lace ratcheting system is placed on a top of a footwear item and fastens the first lace and the second lace which emerge from the footwear item below; wherein the first lace emerges from the footwear item below and enters the first channel via the first channel entrance and the second lace emerges from the footwear item below and enters the second channel via the second channel entrance; the lace ratcheting system is configured to lie flattened on top of the footwear item and to resist turning of the lace ratcheting system at the forwards turning direction or at the backwards turning direction since the first cannel entrance and the second channel entrance are situated between the rear side of the lace ratcheting system and the front side of the horizontal rear floor extension;

the lace ratcheting system is configured to resist turning at forwards turning direction or at backwards turning direction since upon turning at forwards turning direction or at backwards turning direction the lace ratcheting system is configured to raise both the first channel entrance and the second channel entrance above the top of the footwear item and to pull upwards the fastened first lace and the fastened second lace.

17. The lace ratcheting system of claim 1, wherein the first blade is made of a flat sheet metal; wherein the first blade has a first rear blade and the first blade front; wherein the first blade front is wider than the first rear blade which is configured to be installed into a first slot in the first blade holder; the first blade holder also has a first stamping aperture configured for stamping the first rear blade in order to prevent it from falling out after its installment in the first slot;

wherein the second blade is made from the flat sheet metal; wherein the second blade has a second rear blade and the second blade front; wherein the second blade front is wider than the second rear blade which is configured to be installed into a second slot in the second blade holder; the second blade holder also has a second stamping aperture configured for stamping the second rear blade in order to prevent it from falling out after its installment in the second slot.

18. The lace ratcheting system of claim 1, wherein all the components of the lace ratcheting system except the first blade and the second blade are made of elastic plastic materials.

* * * * *